United States Patent
Chen et al.

(10) Patent No.: US 11,733,912 B2
(45) Date of Patent: Aug. 22, 2023

(54) INTELLIGENT TARGET ROUTING IN A DISTRIBUTED STORAGE SYSTEM

(71) Applicant: Dell Products L.P., Round Rock, TX (US)

(72) Inventors: Xiangping Chen, Sherborn, MA (US); Walter O'Brien, III, Westborough, MA (US); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 17/578,609

(22) Filed: Jan. 19, 2022

(65) Prior Publication Data

US 2023/0229341 A1  Jul. 20, 2023

(51) Int. Cl.
G06F 3/06 (2006.01)

(52) U.S. Cl.
CPC ............ G06F 3/0655 (2013.01); G06F 3/061 (2013.01); G06F 3/067 (2013.01)

(58) Field of Classification Search
None
See application file for complete search history.

(56) References Cited

U.S. PATENT DOCUMENTS

| | | | |
|---|---|---|---|
| 10,310,760 | B1 | 6/2019 | Dreier et al. |
| 10,893,105 | B1 | 1/2021 | Bono et al. |
| 2003/0149773 | A1 | 8/2003 | Harbin et al. |
| 2009/0154472 | A1 | 6/2009 | Chung et al. |
| 2009/0254572 | A1* | 10/2009 | Redlich .................. G06Q 10/06 |
| 2013/0055249 | A1* | 2/2013 | Vaghani .............. G06F 9/45558 718/1 |
| 2013/0198312 | A1 | 8/2013 | Tamir et al. |
| 2013/0226887 | A1 | 8/2013 | Braam et al. |
| 2015/0012607 | A1 | 1/2015 | Cayton et al. |
| 2017/0177222 | A1 | 6/2017 | Singh et al. |
| 2018/0205635 | A1* | 7/2018 | Kim ...................... G06F 16/182 |

(Continued)

OTHER PUBLICATIONS

Storpool Storage, "Demystifying: What is NVMeOF?" https://storpool.com/blog/demystifying-what-is-nvmeof, Sep. 12, 2017, 4 pages.

(Continued)

*Primary Examiner* — Brian R Peugh
(74) *Attorney, Agent, or Firm* — Ryan, Mason & Lewis, LLP

(57) ABSTRACT

An apparatus includes at least one processing device configured to establish a plurality of paths between at least one initiator of a host device and a plurality of targets of respective storage nodes of a distributed storage system, and for each of a plurality of input-output operations generated in the host device for delivery to the distributed storage system: to access a target lookup service of the host device to determine a particular one of the storage nodes that stores data for a logical storage volume and offset targeted by the input-output operation, to select a particular one of the plurality of paths from the initiator to one of the targets on the particular storage node, and to send the input-output operation to the particular storage node over the selected path. The initiator and the targets are illustratively configured in accordance with a designated standard storage access protocol.

20 Claims, 7 Drawing Sheets

(56) References Cited

U.S. PATENT DOCUMENTS

2020/0019521 A1 1/2020 Solanki et al.
2020/0026606 A1 1/2020 Farnum et al.
2021/0405915 A1* 12/2021 Agarwal ............... G06F 3/0604

OTHER PUBLICATIONS

VMware, "VMware ESX Server," Product Datasheet, 2007, 4 pages.
Wikipedia, "Host Adapter," https://en.wikipedia.org/wiki/Host_adapter, Jul. 19, 2021, 4 pages.
Wikipedia, "iSCSI," https://en.wikipedia.org/wiki/ISCSI, Dec. 22, 2021, 10 pages.
Wikipedia, "NVM Express," https://en.wikipedia.org/wiki/NVM_Express, Jan. 13, 2022, 18 pages.
A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.
Wikipedia, "Remote Direct Memory Access," https://en.wikipedia.org/wiki/Remote_direct_memory_access, Jan. 30, 2021, 3 pages.
M. Hoyt, "ScaleIO Tech Overview and Concepts: SDS-SAN vs SDS-Array," https://www.thinkahead.com/TheLAB/scaleio-tech-overview-concepts-sds-san-vs-sds-array/, Apr. 5, 2017, 16 pages.
EMC Corporation, "EMC ScaleIO Architectural and Functional Overview," EMC White Paper, Dec. 2013, 13 pages.
Dell EMC, "Dell EMC VxFlex OS: Networking Best Practices and Design Considerations," Dell EMC White Paper, Jul. 2018, 38 pages.
R. Kerns, "What is Block I/O?" searchstorage.techtarget.com/answer/What-is-block-I-O, Oct. 19, 2005, 2 pages.
Janalta Interactive, "Client-Side" https://www.techopedia.com/definition/439/client-side, Accessed Jan. 14, 2022, 8 pages.
EMC Corporation, "EMC ScaleIO Design Considerations and Best Practices," EMC White Paper, Jun. 2016, 30 pages.
Mellanox Technologies, "RoCE vs. IWARP Competitive Analysis," White Paper, Feb. 2017, 6 pages.
NVM Express, "NVM Express Base Specification, Revision 2.0a," NVM Express, Jul. 23, 2021, 454 pages.

* cited by examiner

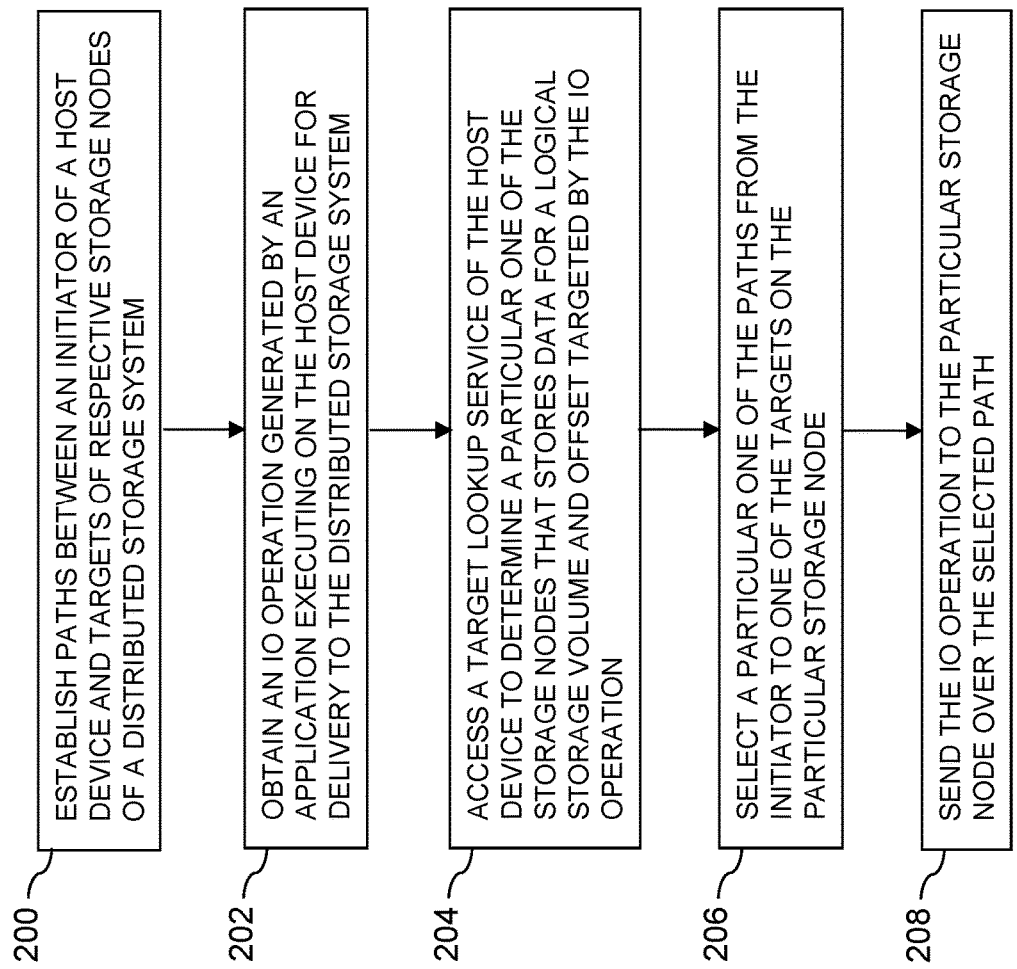

INTELLIGENT TARGET ROUTING IN A DISTRIBUTED STORAGE SYSTEM

FIELD

The field relates generally to information processing systems, and more particularly to storage in information processing systems.

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. Data within the system is partitioned, striped, and replicated across the distributed storage nodes. For a storage administrator, the software-defined storage system provides a logical view of a given dynamic storage pool that can be expanded or contracted at ease, with simplicity, flexibility, and different performance characteristics. For applications running on a host device that utilizes the software-defined storage system, such a storage system provides a logical storage object view to allow a given application to store and access data, without the application being aware that the data is being dynamically distributed among different storage nodes potentially at different sites. In these and other software-defined storage system arrangements, it can be difficult to integrate such systems with advanced storage access protocols such as Non-Volatile Memory Express (NVMe) over Fabrics, also referred to as NVMeF, or NVMe over Transmission Control Protocol (TCP), also referred to as NVMe/TCP. For example, some software-defined storage systems utilize proprietary protocols to enable seamless access to data located in different storage nodes on behalf of the applications, and to hide the details of data distribution and physical storage locations from those applications. In such arrangements, modifying an existing software-defined storage system to support the advanced storage access protocol can be unduly costly and complex, and may introduce performance issues.

SUMMARY

Illustrative embodiments provide techniques for intelligent target routing in a software-defined storage system or other type of distributed storage system. Such techniques advantageously facilitate the usage of advanced storage access protocols such as NVMeF or NVMe/TCP while avoiding the above-described drawbacks of conventional practice. For example, some embodiments avoid the excessive costs and complexity of redesigning existing software-defined storage systems to support NVMeF, NVMe/TCP or other advanced storage access protocols, while also ensuring low latency and high performance.

Some embodiments also advantageously facilitate the leveraging of hardware acceleration utilizing Smart Network Interface Cards (SmartNICs) and other hardware acceleration arrangements based on Data Processing Units (DPUs).

For example, by providing a data storage location target lookup service that allows separation of data access and data location lookup, illustrative embodiments can more easily implement advanced storage access protocols such as NVMeF or NVMe/TCP and associated hardware acceleration arrangements in a software-defined storage system.

Although some embodiments are described herein in the context of implementing an NVMeF or NVMe/TCP access protocol in a software-defined storage system, it is to be appreciated that other embodiments can be implemented in other types of distributed storage systems using other storage access protocols.

In one embodiment, an apparatus comprises at least one processing device that includes a processor coupled to a memory. The processing device is configured to establish a plurality of paths between at least one initiator of a host device and a plurality of targets of respective storage nodes of a distributed storage system, and for each of a plurality of input-output (IO) operations generated in the host device for delivery to the distributed storage system: to access a target lookup service of the host device to determine a particular one of the storage nodes that stores data for a logical storage volume and offset targeted by the IO operation, to select a particular one of the plurality of paths from the initiator to one of the targets on the particular storage node, and to send the IO operation to the particular storage node over the selected path.

In some embodiments, the initiator of the host device and the targets of the respective storage nodes are implemented in accordance with an NVMeF or NVMe/TCP access protocol, although a wide variety of other designated standard storage access protocols can be used.

The distributed storage system illustratively comprises a software-defined storage system and the storage nodes illustratively comprise respective software-defined storage server nodes of the software-defined storage system.

In some embodiments, the target lookup service maintains a mapping between a logical address space and a physical storage space of the distributed storage system. For example, the target lookup service can maintain the mapping based at least in part on metadata obtained from one or more control plane servers of the distributed storage system, illustratively over an out-of-band communication channel relative to communication channels used to deliver the IO operations to the distributed storage system.

These and other illustrative embodiments include, without limitation, apparatus, systems, methods and processor-readable storage media.

BRIEF DESCRIPTION OF THE DRAWINGS

FIG. 2 is a flow diagram of a process for intelligent target routing in a distributed storage system in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
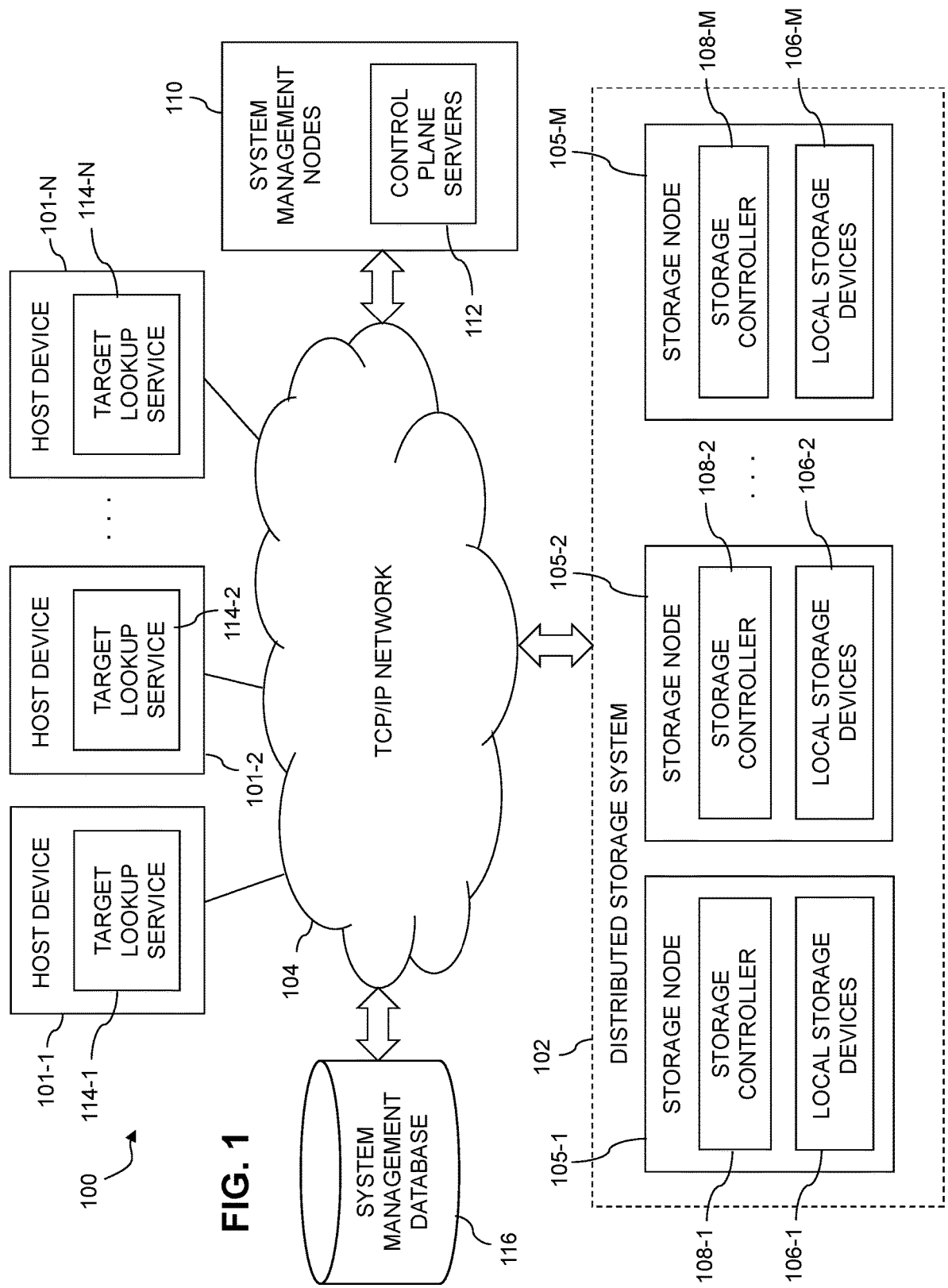
FIG. 1 is a block diagram of an information processing system incorporating functionality for intelligent target routing in a distributed storage system in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a distributed storage system 102 shared by the host devices 101. The host devices 101 and distributed storage system 102 in this embodiment are configured to communicate with one another via a network 104 that illustratively utilizes protocols such as Transmission Control Protocol (TCP) and/or Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is one possible example of what is more generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space.

Other types of distributed storage systems can be used in other embodiments. For example, storage system 102 can comprise multiple distinct storage arrays, such as a production storage array and a backup storage array, possibly deployed at different locations. Accordingly, in some embodiments, one or more of the storage nodes 105 may each be viewed as a separate storage array with its own logical address space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments. Examples of such software-defined storage systems will be described in more detail below in conjunction with FIG. 3.

Each of the storage nodes 105 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as "in-flight" IOs that have been admitted by the storage nodes 105 to further processing within the system 100. The storage nodes 105 are illustratively configured to queue IO operations arriving from one or more of the host devices 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

The host devices 101 are illustratively configured to write data to and read data from the distributed storage system 102 comprising storage nodes 105 in accordance with applications executing on those host devices 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand or Gigabit Ethernet, in addition to or in place of FC. Numerous alternative networking arrangements are possible in a given embodiment, as will be appreciated by those skilled in the art. Other examples include RDMA over Converged Ethernet (ROCE) or InfiniBand over Ethernet (IBoE).

The first storage node 105-1 comprises a plurality of storage devices 106-1 and an associated storage controller 108-1. The storage devices 106-1 store metadata pages and user data pages associated with one or more storage volumes of the distributed storage system 102. The storage volumes illustratively comprise respective logical units (LUNs) or other types of logical storage volumes. The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage controller 108-2, and storage node 105-M comprises a plurality of storage devices 106-M and an associated storage controller 108-M.

The storage devices 106-2 through 106-M store metadata pages and user data pages associated with one or more storage volumes of the distributed storage system 102, such as the above-noted LUNs. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes via a remote direct memory access (RDMA) interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controllers 108 of the storage nodes 105 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 105 of the distributed storage system of FIG. 1.

In some embodiments, the storage nodes 105 of the distributed storage system collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 105 illustratively comprise SCSI or iSCSI commands, other embodiments can implement IO operations utilizing command features and functionality associated with NVM Express (NVMe), as described in the NVMe Specification, Revision 2.0a, July 2021, which is incorporated by reference herein. Other examples of NVMe storage access protocols that may be utilized in illustrative embodiments disclosed herein include NVMe over Fabrics, also referred to herein as NVMeF, and NVMe over TCP, also referred to herein as NVMe/TCP.

Some embodiments disclosed herein are configured to utilize one or more RAID arrangements to store data across the storage devices 106 in each of one or more of the storage nodes 105 of the distributed storage system 102.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controllers 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes an array of n different "disks" denoted 1 through n, each a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the disks in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are connected to each other in a full mesh network, and are collectively managed by a system manager. A given set of local persistent storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a plurality of system management nodes 110 that are illustratively configured to provide system management functionality of the type noted above. Such functionality in the present embodiment illustratively further involves utilization of control plane servers 112 and a system management database 116. In some embodiments, at least portions of the system management nodes 110 and their associated control plane servers 112 are distributed over the storage nodes 105. For example, a designated subset of the storage nodes 105 can each be configured to include a corresponding one of the control plane servers 112. Other system management functionality provided by system management nodes 110 can be similarly distributed over a subset of the storage nodes 105.

The system management database 116 stores configuration and operation information of the system 100 and portions thereof are illustratively accessible to various system administrators such as host administrators and storage administrators.

The manner in which intelligent target routing functionality is implemented in system 100 will now be described in more detail.

The host devices 101-1, 101-2, . . . 101-N include respective instances of target lookup service 114-1, 114-2, . . . 114-N. Such instances of target lookup service 114 are utilized in performing intelligent target routing.

In some embodiments, IO operations are processed in the host devices 101 utilizing their respective instances of target lookup service 114 in the following manner. A given one of the host devices 101 establishes a plurality of paths between at least one initiator of the given host device and a plurality of targets of respective storage nodes 105 of the distributed storage system 102, and for each of a plurality of IO operations generated in the given host device for delivery to the distributed storage system 102, accesses the target lookup service of the host device to determine a particular one of the storage nodes 105 that stores data for a logical storage volume and offset targeted by the IO operation, selects a particular one of the plurality of paths from the initiator to one of the targets on the particular storage node, and sends the IO operation to the particular storage node over the selected path.

The given host device above is an example of what is more generally referred to herein as "at least one processing device" that includes a processor coupled to a memory.

It is to be appreciated that intelligent target routing as disclosed herein can be performed independently by each of the host devices 101, with possible involvement of additional or alternative system components.

In some embodiments, the initiator of the given host device and the targets of the respective storage nodes 105 are configured to support a designated standard storage access protocol, such as an NVMe access protocol or a SCSI access protocol. As more particularly examples in the NVMe context, the designated storage access protocol may comprise an NVMeF or NVMe/TCP access protocol, although a wide variety of additional or alternative storage access protocols can be used in other embodiments.

The instance of target lookup service 114 on the given host device in some embodiments is implemented at least in part (i) within the initiator of the given host device or (ii) as an add-on service to the initiator of the given host device.

Additionally or alternatively, the initiator of the given host device may be implemented at least in part within a smart network interface card (SmartNIC) of the host device utilizing a data processing unit (DPU) of the SmartNIC. Numerous other implementation arrangements involving other types of processing devices can be used.

In some embodiments, each instance of the target lookup service 114 maintains a mapping between a logical address space and a physical storage space of the distributed storage system 102. For example, the instances of target lookup service 114 each illustratively maintain the mapping based at least in part on metadata obtained from one or more of the control plane servers 112 of the system management nodes 110. As indicated previously, such control plan servers and other system management in some embodiments are distributed across the storage nodes 105 of the distributed storage system 102, rather than implemented on separate system management nodes 110 as illustrated in FIG. 1.

In some embodiments, the instances of the target lookup service 114 are each configured to communicate with one or more control plane servers 112 within or otherwise associated with the distributed storage system 102 via an out-of-band communication channel relative to communication channels utilized for delivery of the IO operations from the host devices 101 to the distributed storage system 102.

In some embodiments, accessing the instances of target lookup service 114 comprises accessing a given such target lookup service via an application programming interface (API) of the target lookup service. Numerous alternative access arrangements can be used in other embodiments.

As mentioned above, the distributed storage system 102 in some embodiments comprises a software-defined storage system and the storage nodes 105 comprise respective software-defined storage server nodes of the software-defined storage system.

In such an arrangement, the instances of target lookup service 114 illustratively establish a configuration mapping between a first configuration associated with a particular storage access protocol and a second configuration associated with the software-defined storage server nodes of the software-defined storage system. For example, the configuration mapping illustratively comprises a mapping between a transport IP address of the storage access protocol and a data server IP address of a given one of the software-defined storage server nodes. The configuration mapping in some embodiments further comprises a mapping between a target identifier of the storage access protocol and a target identifier of a given one of the software-defined storage server nodes, and/or a mapping between a namespace identifier of the storage access protocol and a storage volume object identifier of a given one of the software-defined storage server nodes.

The host devices 101 can comprise additional or alternative components. For example, in some embodiments the host devices 101 further comprise respective sets of IO queues and respective multi-path input-output (MPIO) drivers. The MPIO drivers collectively comprise a multi-path layer of the host devices 101. Path selection functionality for delivery of IO operations from the host devices 101 to the distributed storage system 102 is provided in the multi-path layer by respective instances of path selection logic implemented within the MPIO drivers. In some embodiments, the instances of target lookup service 114 are implemented at least in part within the MPIO drivers of the host devices 101.

The MPIO drivers may comprise, for example, otherwise conventional MPIO drivers, such as PowerPath® drivers from Dell Technologies, suitably modified in the manner disclosed herein to provide functionality for intelligent target routing. Other types of MPIO drivers from other driver vendors may be suitably modified to incorporate functionality for intelligent target routing as disclosed herein.

In some embodiments, the host devices 101 comprise respective local caches, implemented using respective memories of those host devices. A given such local cache can be implemented using one or more cache cards. A wide variety of different caching techniques can be used in other embodiments, as will be appreciated by those skilled in the art. Other examples of memories of the respective host devices 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the host devices 101. For example, IO operations can be generated by each of multiple processes of a database application running on one or more of the host devices 101. Such processes issue IO operations for delivery to the distributed storage system 102 over the network 104. Other types of sources of IO operations may be present in a given implementation of system 100.

A given IO operation is therefore illustratively generated by a process of an application running on a given one of the host devices 101, and is queued in one of the IO queues of the given host device with other operations generated by other processes of that application, and possibly other processes of other applications.

The paths from the given host device to the distributed storage system 102 illustratively comprise paths associated with respective initiator-target pairs, with each initiator comprising a host bus adaptor (HBA) or other initiating entity of the given host device and each target comprising a port or other targeted entity corresponding to one or more of the storage devices 106 of the distributed storage system 102. As noted above, the storage devices 106 illustratively comprise LUNs or other types of logical storage devices.

In some embodiments, the paths are associated with respective communication links between the given host device and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the network 104 and the distributed storage system 102. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given one of the host devices 101 with a need to distinguish which IO is related to which producer. One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of a given one of the host devices 101 but have respective unique identifiers associated therewith.

Additionally or alternatively, different ones of the multiple virtual initiators are illustratively associated with respective different ones of a plurality of virtual machines of the given host device that share a single HBA of the given host device, or a plurality of logical partitions of the given host device that share a single HBA of the given host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host device in delivering IO operations from the IO queues of that host device to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host device to the distributed storage system 102 is considered an "outstanding" command until such time as its execution is completed in the viewpoint of the given host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the given host device and that the targets of the plurality of initiator-target pairs comprise respective ports of the distributed storage system 102. Examples of such HBAs and storage array ports are illustrated in conjunction with the embodiment of FIG. 4. A wide variety of other types and arrangements of initiators and targets can be used in other embodiments.

Selecting a particular one of multiple available paths for delivery of a selected one of the IO operations from the given host device is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume to which the particular IO operation is directed.

It should be noted that paths may be added or deleted between the host devices 101 and the distributed storage system 102 in the system 100. For example, the addition of one or more new paths from the given host device to the distributed storage system 102 or the deletion of one or more existing paths from the given host device to the distributed storage system 102 may result from respective addition or deletion of at least a portion of the storage devices 106 of the distributed storage system 102.

Addition or deletion of paths can also occur as a result of zoning and masking changes or other types of storage system reconfigurations performed by a storage administrator or other user. Some embodiments are configured to send a predetermined command from the given host device to the distributed storage system 102, illustratively utilizing the MPIO driver, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the distributed storage system 102 as well to discover the disappearance of any existing LUNs that have been deleted from the distributed storage system 102.

The MPIO driver of the given host device in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an Operating System (OS) kernel of the given host device.

For each of one or more new paths identified in the path discovery scan, the given host device may be configured to execute a host registration operation for that path. The host registration operation for a given new path illustratively provides notification to the distributed storage system 102 that the given host device has discovered the new path.

As indicated previously, the storage nodes 105 of the distributed storage system 102 process IO operations from one or more host devices 101 and in processing those IO operations run various storage application processes that generally involve interaction of that storage node with one or more other ones of the storage nodes.

In the FIG. 1 embodiment, the distributed storage system 102 comprises storage controllers 108 and corresponding sets of storage devices 106, and may include additional or alternative components, such as sets of local caches.

The storage controllers 108 illustratively control the processing of IO operations received in the distributed storage system 102 from the host devices 101. For example, the storage controllers 108 illustratively manage the processing of read and write commands directed by the MPIO drivers of the host devices 101 to particular ones of the storage devices 106. The storage controllers 108 can be implemented as respective storage processors, directors or other storage system components configured to control storage system operations relating to processing of IO operations. In some embodiments, each of the storage controllers 108 has a different one of the above-noted local caches associated therewith, although numerous alternative arrangements are possible.

An additional example of an illustrative process for implementing at least some of the above-described intelligent target routing functionality will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

As another example, the storage nodes 105 in some embodiments are part of a distributed content addressable storage system in which logical addresses of data pages are mapped to physical addresses of the data pages in the storage devices 106 using respective hash digests, hash handles or other content-based signatures that are generated from those data pages using a secure hashing algorithm. A wide variety of other types of distributed storage systems can be used in other embodiments.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RDMA. For example, respective sets of IP links used in data transfer and corresponding messaging could be associated with respective different ones of the routing modules.

The particular features described above in conjunction with FIG. 1 should not be construed as limiting in any way, and a wide variety of other system arrangements utilizing target lookup services on respective host devices for facilitating efficient delivery of IO operations to storage nodes of a distributed storage system are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated host devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the host devices 101 and the storage nodes 105 to reside in different data centers. Numerous other distributed implementations of the storage nodes 105 and their respective associated sets of host devices 101 are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, distributed storage system 102, storage nodes 105, storage devices 106, storage controllers 108, system management nodes 110 and instances of target lookup service 114 can be used in other embodiments. For example, as mentioned previously, system management functionality of system management nodes 110 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of intelligent target routing functionality as disclosed herein can be implemented in one or more host devices, in a storage system, or partially in a host device and partially in a storage system. Accordingly, illustrative embodiments are not limited to arrangements in which intelligent target routing functionality is implemented primarily in a particular host device or set of host devices, and therefore such embodiments encompass various alternative arrangements, such as, for example, an arrangement in which the functionality is implemented at least in part in a storage system, or distributed over one or more storage systems and one or more associated host devices, each comprising one or more processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for implementing intelligent target routing utilizing a target lookup service 114 of one or more of the host devices 101. This process may be viewed as an example algorithm implemented at least in part by a given one of the host devices 101 utilizing its corresponding instance of target lookup service 114. These and other algorithms for intelligent target routing as disclosed herein can be implemented using other types and arrangements of system components in other embodiments.

The intelligent target routing process illustrated in FIG. 2 includes steps 200 through 208, and is assumed to be implemented primarily by a particular one of the host devices 101 utilizing its corresponding instance of target lookup service 114. Similar processes may be implemented primarily by each of the other ones of the host devices 101 utilizing their respective instances of target lookup service 114.

In step 200, a plurality of paths are established between at least one initiator of a host device and a plurality of targets of respective storage nodes of a distributed storage system. In some embodiments, the paths are established at least in part utilizing one or more MPIO drivers of the host device, although it is to be appreciated that use of MPIO drivers or a multi-path layer is not a requirement of the present disclosure. There are illustratively multiple paths between each initiator and each of one or more of the targets.

In step 202, an IO operation is obtained. The IO operation is illustratively generated by an application executing on the host device for delivery to the distributed storage system. As indicated previously, the distributed storage system in some embodiments comprises a software-defined storage system and the storage nodes comprise respective software-defined storage server nodes of the software-defined storage system. Other types of distributed storage systems can be used in other embodiments.

In step 204, a target lookup service of the host device is accessed to determine a particular one of the storage nodes that stores data for a logical storage volume and offset targeted by the IO operation. The target lookup service in some embodiments is implemented by or in conjunction with one or more initiators. For example, the target lookup service may be implemented at least in part within or otherwise in association with an initiator. Additionally or alternatively, the target lookup service may be implemented as an add-on service provided to the one or more initiators, illustratively by one or more MPIO drivers of the host device. The target lookup service in some embodiments maintains a mapping between a logical address space and a physical storage space of the distributed storage system, as described in more detail elsewhere herein. The target lookup service in some embodiments is accessible via an API, but other techniques can be used in other embodiments to access the target lookup service.

In step 206, a particular one of the plurality of paths from the initiator to one of the targets on the particular storage node is selected. Such selection in some embodiments makes use of path selection logic of one or more MPIO drivers of the host device, although again it is to be understood that use of MPIO drivers is not required.

In step 208, the IO operation is sent to the particular storage node of the distributed storage node over the selected path from an initiator of the host device to the target of the particular storage node.

Steps 200 through 208 are illustratively repeated for each of a plurality of additional IO operations generated by one or more applications executing on the host device. Multiple such processes may operate in parallel with one another in order to process IO operations generated by respective different applications.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing intelligent target routing between host devices and a distributed storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different intelligent target routing processes for respective different applications executing on one or more host devices of an information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Host devices can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, storage controllers and other system components may be implemented at least in part using processing devices of such processing platforms. For example, respective target lookup services and other related logic instances of the host devices can be implemented in respective containers running on respective ones of the processing devices of a processing platform.

Additional examples of illustrative embodiments will now be described with reference to FIGS. 3A and 3B. These embodiments illustrate an example of a distributed storage system that more particularly comprises a software-defined storage system having a plurality of software-defined storage server nodes, also referred to as SDS server nodes, configured to utilize an NVMe storage access protocol such as NVMeF or NVMe/TCP. Such SDS server nodes are examples of "storage nodes" as that term is broadly used herein. As will be appreciated by those skilled in the art, similar embodiments can be implemented without the use of software-defined storage and with other storage access protocols.

Figure 3A:
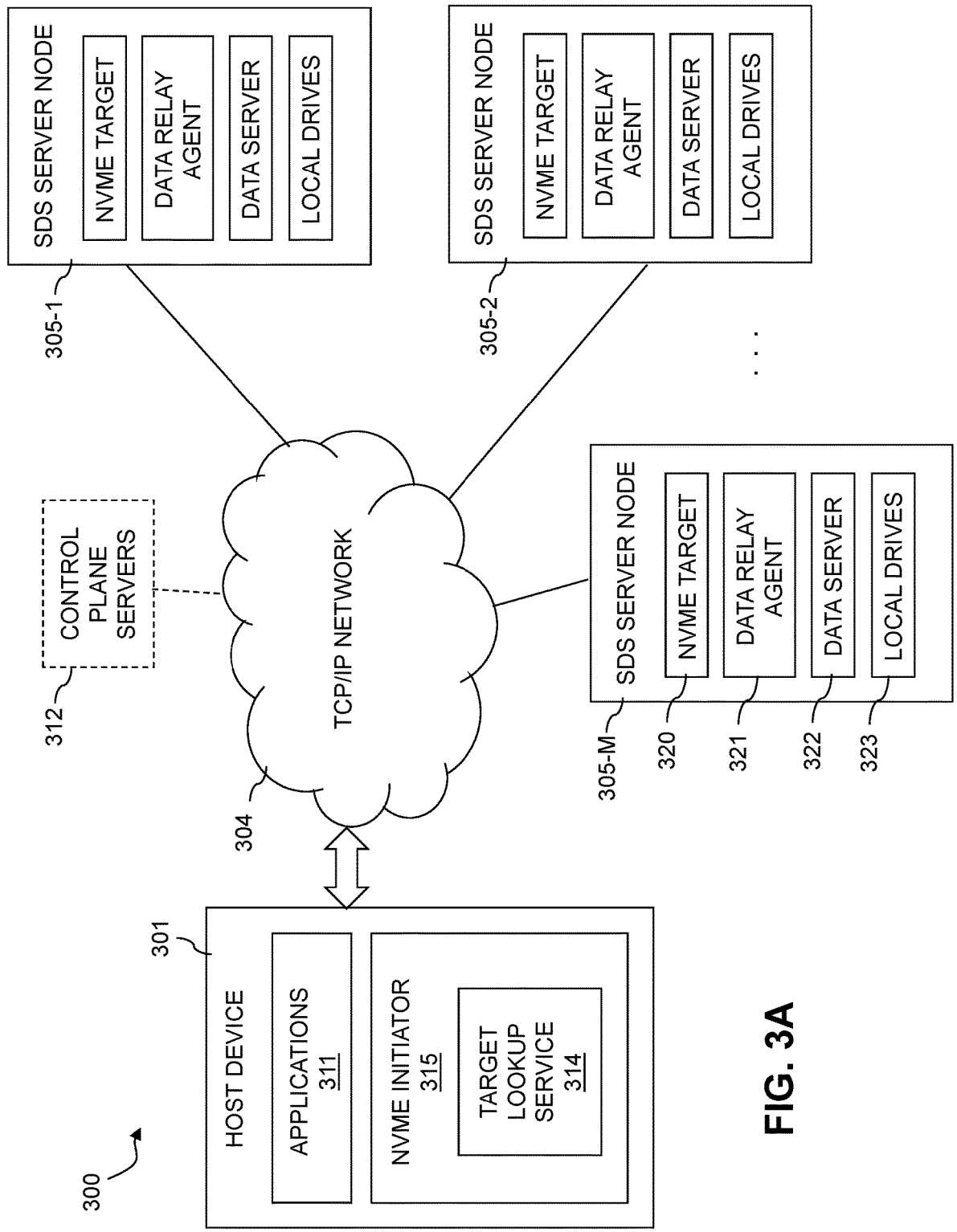
FIGS. 3A and 3B show other examples of information processing systems incorporating functionality for intelligent target routing in a software-defined storage system in illustrative embodiments. These figures are collectively referred to herein as FIG. 3.

Referring initially to FIG. 3A, an information processing system 300 comprises a host device 301 configured to communicate over a network 304, illustratively a TCP/IP network, with a software-defined storage system comprising a plurality of SDS server nodes 305-1, 305-2, . . . 305-M and corresponding control plane servers 312. The control plane servers 312 are shown in dashed outline as the functionality of such servers in illustrative embodiments is distributed over a particular subset of the SDS server nodes 305 rather than being implemented on separate nodes of the software-defined storage system. The control plane servers 312 provide system management functionality such as centralized storage provisioning, monitoring, membership management, as well as storage partitioning.

A plurality of applications 311 execute on the host device 301 and generate IO operations that are delivered to particular ones of the SDS server nodes 305 via at least one NVMe initiator 315 that in this embodiment implements a target lookup service 314. In other embodiments, the target lookup service 314 is implemented externally to the NVMe initiator, such as within an MPIO driver of an MPIO layer of the host device 301.

Each of the SDS server nodes 305 in the present embodiment comprises at least one NVMe target 320, a data relay agent 321, a data server 322 and a set of local drives 323. The data relay agent 321 facilitates relaying of IO requests between different ones of the SDS server nodes 305, and the data servers 322 provide access to data stored in the local drives 323 of their respective SDS server nodes 305. Additional or alternative components may be included in the SDS server nodes 305 in illustrative embodiments.

Although single NVMe initiators and targets are shown in respective ones of the host device 301 and the SDS server nodes 305, this is by way of simplified illustration only, and other embodiments can include multiple NVMe initiators within host device 301 and multiple NVMe targets within each of the SDS server nodes 305.

In some embodiments, the SDS server nodes 305 are configured at least in part as respective PowerFlex® software-defined storage nodes from Dell Technologies, suitably modified as disclosed herein to include NVMe targets 320, although other types of storage nodes can be used in other embodiments.

As mentioned previously, absent use of the intelligent target routing techniques disclosed herein, it can be difficult in software-defined storage systems and other types of distributed storage systems to efficiently integrate such systems with advanced storage access protocols such as NVMeF or NVMe/TCP.

For example, some software-defined storage systems utilize proprietary protocols to enable seamless access to data located in different storage nodes on behalf of the applications, and to hide the details of data distribution and physical storage locations from those applications. In such arrangements, modifying an existing software-defined storage system to support the advanced storage access protocol can be unduly costly and complex, and may introduce performance issues.

Illustrative embodiments herein overcome these and other disadvantages of conventional practice by providing techniques for intelligent target routing in a software-defined storage system or other type of distributed storage system.

This is advantageously achieved in the system 300 by configuring the host device 301 to include target lookup service 314 so as to allow the host device 301 to direct each IO operation to the appropriate one of the SDS server nodes 305 that locally stores the targeted data in its local drives 323, thereby avoiding additional network "hops" between multiple SDS server nodes 305 in the processing of IO operations and ensuring low latency and high performance. In addition, the excessive costs and complexity for redesigning the software-defined storage system to support advanced storage access protocols such as NVMeF or NVMe/TCP are advantageously avoided in these and other embodiments herein.

The target lookup service 314 is illustratively configured to provide a data storage location target lookup service that allows separation of data access and data location lookup in the system 300. This optimizes the initial delivery of the IO operations from the host device 301 to the appropriate corresponding ones of the SDS server nodes 305 locally storing targeted data, avoiding the extra network hop or hops that might otherwise result when a given IO operation targeting data stored locally on one of the SDS server nodes 305 is initially delivered to a different one of the SDS server nodes 305, as those SDS server nodes 305 collectively implement a unified storage pool as seen from the host device 301.

In some embodiments, the target lookup service 314 implements a configuration mapping as well as a mapping between a logical address space and a physical address space of the software-defined storage system.

For example, a configuration mapping component of the target lookup service 314 illustratively establishes a configuration mapping between a designated standard storage access protocol such as NVMe and an internal storage configuration of the software-defined storage system. The address space mapping of the target lookup service then maps between a logical address space of the designated standard storage access protocol and a physical address space collectively implemented by the SDS server nodes 305. Other types of configuration and address space mapping arrangements can be used in other embodiments.

The target lookup service 314 illustratively communicates with the control plane servers 312 in order to obtain metadata that it utilizes to maintain the above-described mapping arrangements. For example, the target lookup service 314 can communicate with one or more of the control plane servers 312 of the software-defined storage system via an out-of-band communication channel relative to communication channels utilized for delivery of the IO operations to the SDS server nodes 305.

The mapping information maintained by the target lookup service 314 in some embodiments is in the form of a table or other arrangement of one or more data structures that associates storage object logical address ranges with particular storage target identifiers and addresses. Such a table or other data structures are illustratively stored in a local cache or other local memory of the host device so as to facilitate quick lookup. The interactions between the target lookup service 314 and the control plane servers 312 or other system entities providing metadata of the software-defined storage system can occur in advance of processing of IO operations, so as to optimize performance. As mentioned previously, an out-of-band channel may be used in order to avoid introducing additional network traffic on the communication channels used for IO processing.

In some embodiments, the target lookup service 314 is accessed via an API of the target lookup service 314. For example, a particular one of the applications 311 generating an IO operation targeting particular data stored in the software-defined storage system can access the target lookup service 314 to determine the particular one of the SDS server nodes 305 that locally stores the targeted data in its local drives 323, such that the IO operation can be directly sent to that particular SDS server node for processing. Other requesting entities, such as one or more MPIO drivers of the host device 301, can similarly access the target lookup service 314 in conjunction with determining an appropriate SDS server node and selecting a corresponding path for delivery of a given IO operation.

The target lookup service 314 in some embodiments is independent from the particular data access protocol used in the software-defined storage system, as the configuration mapping component provides all necessary detail to translate between the standard storage access protocol and the software-defined storage system configuration. For example, in some embodiments, a mapping between an NVMeF or NVMe/TCP configuration and software-defined storage volume objects is established in the manner illustrated below, although other types of configuration mappings can be used in other embodiments:

(a) NVMe transport IP Address <-> Data server IP Address (b) NVMe Target or Controller ID/NQN <-> Data server target ID (c) NVMe NameSpace UUID <-> Storage volume object ID Similar mapping arrangements can be established for other types of standard storage access protocols.

As noted above, the target lookup service 314 in some embodiments includes an API to allow an application or other requesting entity of the host device 301 to obtain an optimal target location for a corresponding storage object identifier, such as a logical storage volume identifier, and additional information such as an offset within the object and possibly also a data length parameter that specifies the length of targeted data from the offset within the object. It is to be appreciated that the term "logical storage volume" as used herein is intended to be broadly construed, so as to encompass any type of storage object comprising data stored in the software-defined storage system. In other embodiments, the requesting entity of the host device can comprise an MPIO driver or a component thereof, as will be described below in conjunction with the FIG. 4 embodiment.

In the FIG. 3A embodiment, each of the SDS server nodes 305 comprises one or more NVMe targets exposing one or more logical storage volumes that include data stored locally in the local drives 323 of those SDS server nodes. When one of the applications 311 needs to access data of a logical storage volume, the host device 301 uses the target lookup service 314 to determine the optimal NVMe targets to which the corresponding IO requests should be sent, and sends the IO requests to those NVMe targets 320 on the particular SDS server nodes 305 via the NVMe initiator 315. The NVMe target on a given one of the SDS server nodes 305 can directly process a received IO request via the data relay agent 321 and data server 322 using locally stored data on the local drives 323 without involving corresponding components on any other one of the SDS server nodes 305.

As indicated previously, different configurations and placements of target lookup service within host device 301 can be used. In the FIG. 3A embodiment, the target lookup service 314 is implemented within or otherwise in association with the NVMe initiator 315. An alternative arrangement will now be described with reference to FIG. 3B.

Figure 3B:
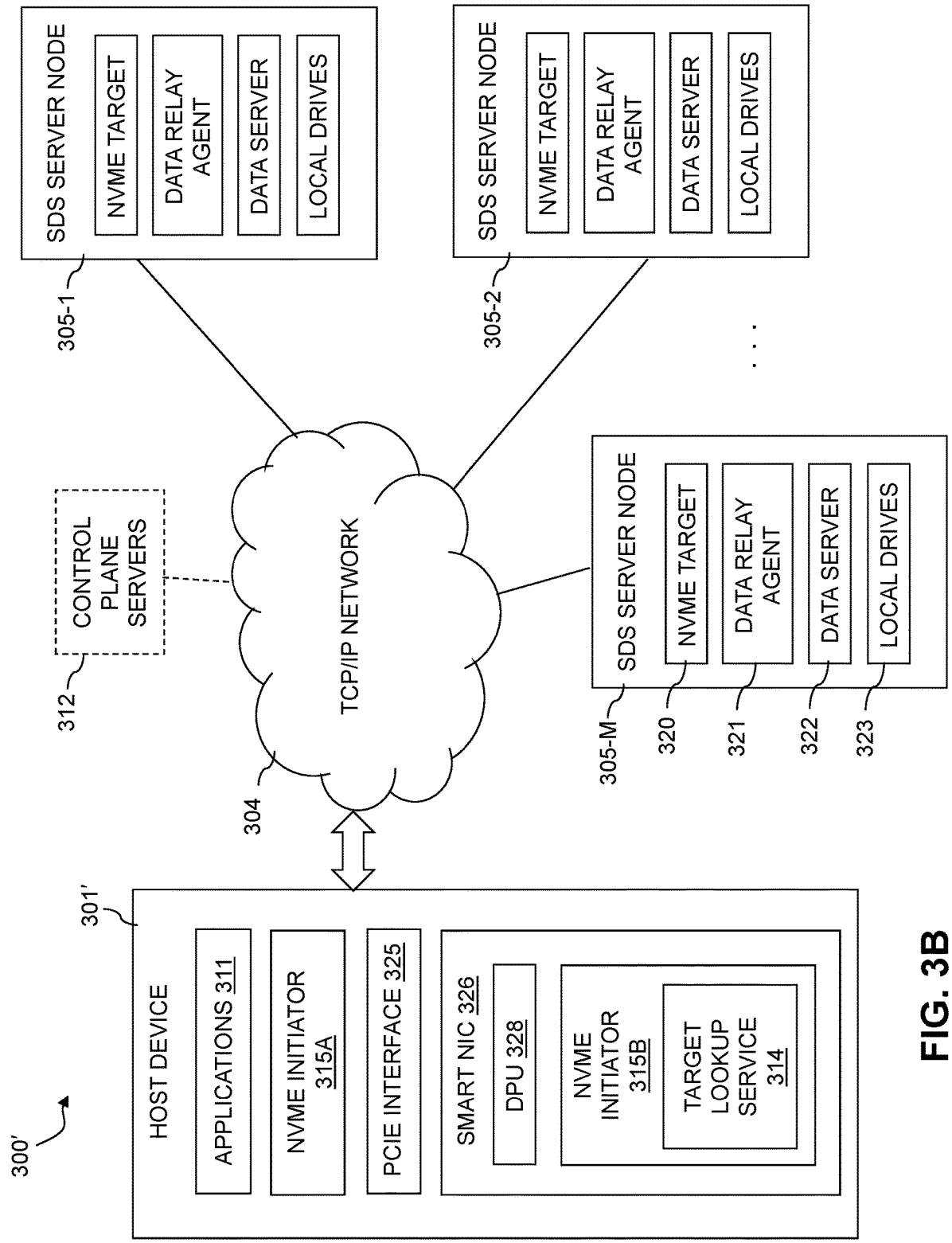

FIG. 3B shows an information processing system 300' which is similar to the corresponding system 300 of FIG. 3A but utilizes a SmartNIC and DPU arrangement as shown, to accelerate the processing of IO operations. The software-defined storage system in this embodiment comprises the same SDS server nodes 305 and control plane servers 312 as previously described. However, a host device 301' includes first and second NVMe initiators 315A and 315B. The first NVMe initiator 315A communicates via a PCIe interface 325 with a SmartNIC 326 that includes a DPU 328. The DPU 328, which may be implemented, for example, utilizing a Mellanox software-defined network acceleration processing (SNAP) device, provides local device emulation or presentation functionality, so as to make the software-defined storage system appear as a local device to the host device 301'.

The target lookup service 314 in this embodiment is implemented within or otherwise in association with the second NVMe initiator 315B, utilizing functionality of the SmartNIC 326 and its corresponding DPU 328. The system 300' otherwise operates in a manner similar to that of system 300 as previously described. The acceleration functionality of SmartNIC 326 and DPU 328 can also be used to implement other features such as compression and encryption for data passing between the host device 301' and the software-defined storage system comprising SDS server nodes 305.

The target lookup service 314 in the embodiments of FIGS. 3A and 3B provides configuration object mapping between an NVMe access protocol and the internal configuration of the software-defined storage system, as well as mapping between application data and actual data target location. By separation of data access and data location lookup, these and other embodiments disclosed herein can more easily implement advanced storage access protocols such as NVMeF or NVMe/TCP and associated hardware acceleration arrangements in a software-defined storage system.

These and other features of illustrative embodiments disclosed herein are examples only, and should not be construed as limiting in any way. Other types of intelligent target routing may be used in other embodiments, and the term "intelligent target routing" as used herein is intended to be broadly construed.

Figure 4:
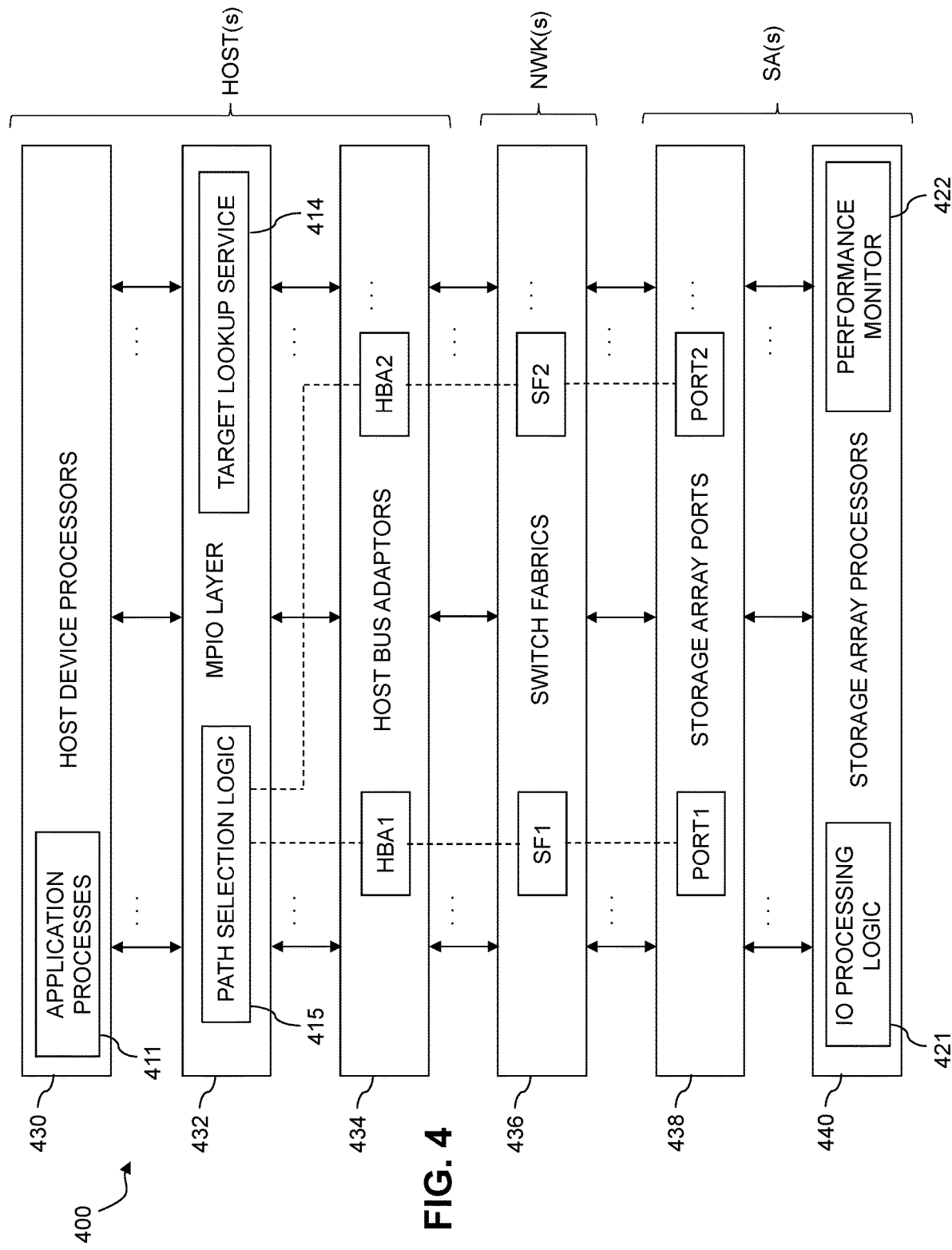
FIG. 4 shows another example of an information processing system incorporating functionality for intelligent target routing in an illustrative embodiment.

Referring now to FIG. 4, another illustrative embodiment is shown. In this embodiment, an information processing system 400 comprises host-side elements that include application processes 411, target lookup service 414 and path selection logic 415, and storage-side elements that include IO processing logic 421 and performance monitor 422. The target lookup service 414 is configured to facilitate intelligent target routing in the manner disclosed herein, by ensuring that IO operations can be directed to the appropriate storage nodes of a distributed storage system comprising one or more storage arrays. There may be separate instances of one or more such elements associated with each of a plurality of system components such as host devices and storage arrays of the system 400. For example, different instances of the target lookup service 414 are illustratively implemented within or otherwise in association with respective ones of a plurality of MPIO drivers of respective host devices.

The system 400 is configured in accordance with a layered system architecture that illustratively includes a host device processor layer 430, an MPIO layer 432, an HBA layer 434, a switch fabric layer 436, a storage array port layer 438 and a storage array processor layer 440. The host device processor layer 430, the MPIO layer 432 and the HBA layer 434 are associated with one or more host devices, the switch fabric layer 436 is associated with one or more SANs or other types of networks, and the storage array port layer 438 and storage array processor layer 440 are associated with one or more storage arrays ("SAs"). A given such storage array illustratively comprises a software-defined storage system or other type of distributed storage system comprising a plurality of storage nodes.

In a manner similar to that described elsewhere herein, a given one of the host devices of the system 400 in the present embodiment is configured to establish a plurality of paths between at least one initiator (e.g., an HBA) of the given host device and a plurality of targets (e.g., storage array ports) of respective storage nodes, and for each of a plurality of IO operations generated by one or more of the application processes 411 in the given host device for delivery to one or more of the storage arrays, to access an instance of target lookup service 414 of the given host device to determine a particular one of the storage nodes that stores data for a logical storage volume and offset targeted by the IO operation, to select, illustratively via one or more MPIO drivers of the MPIO layer 432, a particular one of the plurality of paths from the initiator to one of the targets on the particular storage node, and to send the IO operation to the particular storage node over the selected path.

The system 400 in this embodiment therefore implements intelligent target routing utilizing one or more MPIO drivers of the MPIO layer 432, and associated instances of target lookup service 414.

The application processes 411 generate IO operations that are processed by the MPIO layer 432 for delivery to the one or more storage arrays that collectively comprise a plurality of storage nodes of a distributed storage system. Paths are determined by the path selection logic 415 for sending such IO operations to the one or more storage arrays. These IO operations are sent to the one or more storage arrays in accordance with one or more scheduling algorithms, load balancing algorithms and/or other types of algorithms. Selection and/or adaptation of such algorithms can be responsive at least in part to information obtained from performance monitor 422 of the storage array processor layer 440.

The MPIO layer 432 is an example of what is also referred to herein as a multi-path layer, and comprises one or more MPIO drivers implemented in respective host devices. Each such MPIO driver illustratively comprises respective instances of target lookup service 414 and path selection logic 415 configured as previously described. Additional or alternative layers and logic arrangements can be used in other embodiments.

The IO processing logic 421 implemented in the storage array processor layer 440 controls the processing of read requests, write requests and other commands received from the MPIO drivers of the one or more host devices.

In the system 400, path selection logic 415 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 4 embodiment can illustratively have a set of n paths to a shared storage array, or alternatively different ones of the host devices can have different numbers and types of paths to the storage array.

The path selection logic 415 of the MPIO layer 432 in this embodiment selects paths for delivery of IO operations to the one or more storage arrays having the storage array ports of the storage array port layer 438. More particularly, the path selection logic 415 determines appropriate paths over which to send particular IO operations to particular logical storage devices of the one or more storage arrays.

It is assumed in this embodiment that the host devices through their respective MPIO drivers and respective instances of target lookup service 414 and path selection logic 415 implement intelligent target routing, illustratively with involvement of other system components including at least the HBAs of the HBA layer 434. For example, the path selection logic 415 illustratively utilizes target lookup service 414 to determine a particular storage node to which a given IO operation is to be directed, and selects a path to that particular storage node based at least in part on the determination. Other host device entities can similarly utilize the target lookup service 414 to identify for each of a plurality of IO operations the particular corresponding storage nodes that store the targeted data, in a manner that ensures that the paths selected by the path selection logic are paths to the appropriate storage nodes.

Some implementations of the system 400 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions. Dynamic changes in zoning configurations as disclosed herein are carried out at least in part by interaction between the target lookup service 414 and FC switches of the switch fabric layer 436.

A given host device of system 400 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

These and other embodiments disclosed herein provide significant advantages over conventional approaches.

For example, illustrative embodiments provide intelligent target routing implemented by a host device and/or other system components configured to interact with storage nodes of a distributed storage system over one or more networks.

Some embodiments advantageously facilitate the usage of advanced storage access protocols such as NVMeF or NVMe/TCP in software-defined storage systems and other types of distributed storage systems while avoiding the drawbacks of conventional practice such as excessive costs and complexity for system redesign.

Moreover, these embodiments can ensure low latency and high performance, for example, by avoiding additional network "hops" between multiple storage nodes in the processing of IO operations.

Some embodiments also advantageously facilitate the leveraging of hardware acceleration utilizing SmartNICs and other hardware acceleration arrangements based on DPUs or other processing devices.

For example, by providing a data storage location target lookup service that allows separation of data access and data location lookup, illustrative embodiments can more easily implement advanced storage access protocols and associated hardware acceleration arrangements in a software-defined storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with intelligent target routing functionality will now be described in greater detail with reference to FIGS. 5 and 6. Although described in the context of system 100, these platforms may also be used to implement at least portions of other information processing systems in other embodiments.

Figure 5:
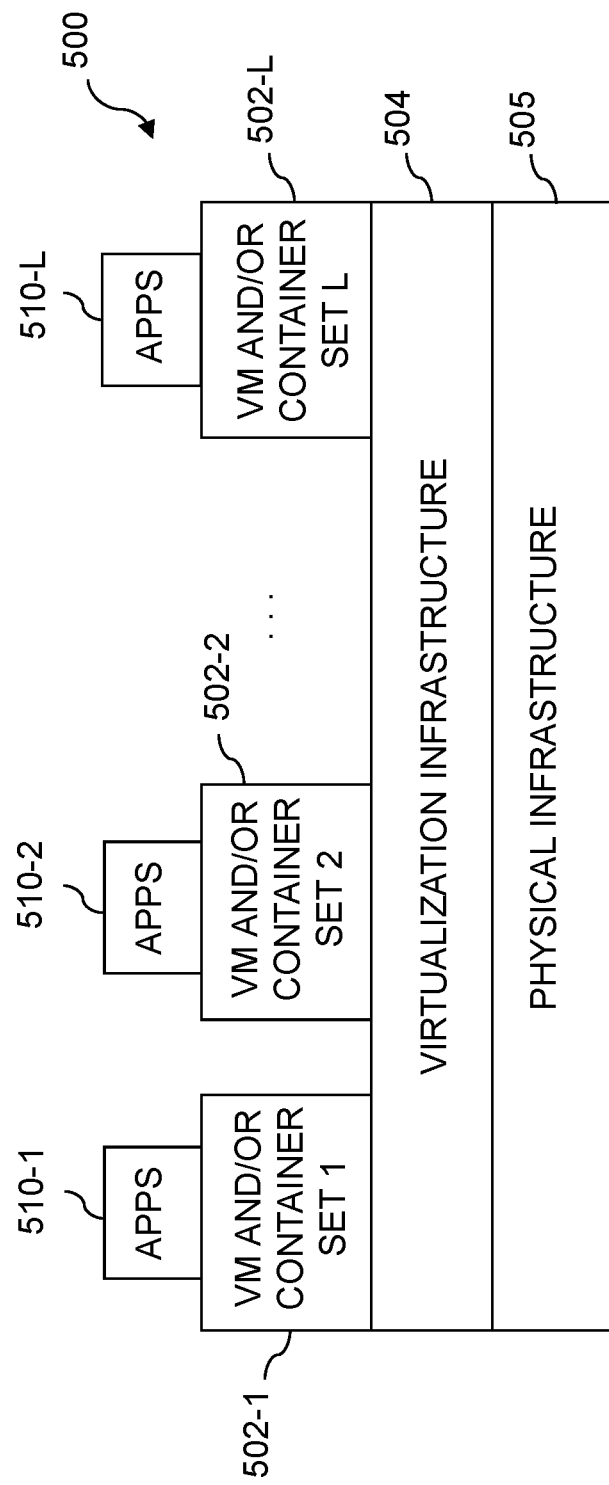
FIGS. 5 and 6 show examples of processing platforms that may be utilized to implement at least a portion of an information processing system in illustrative embodiments.
Figure 6:
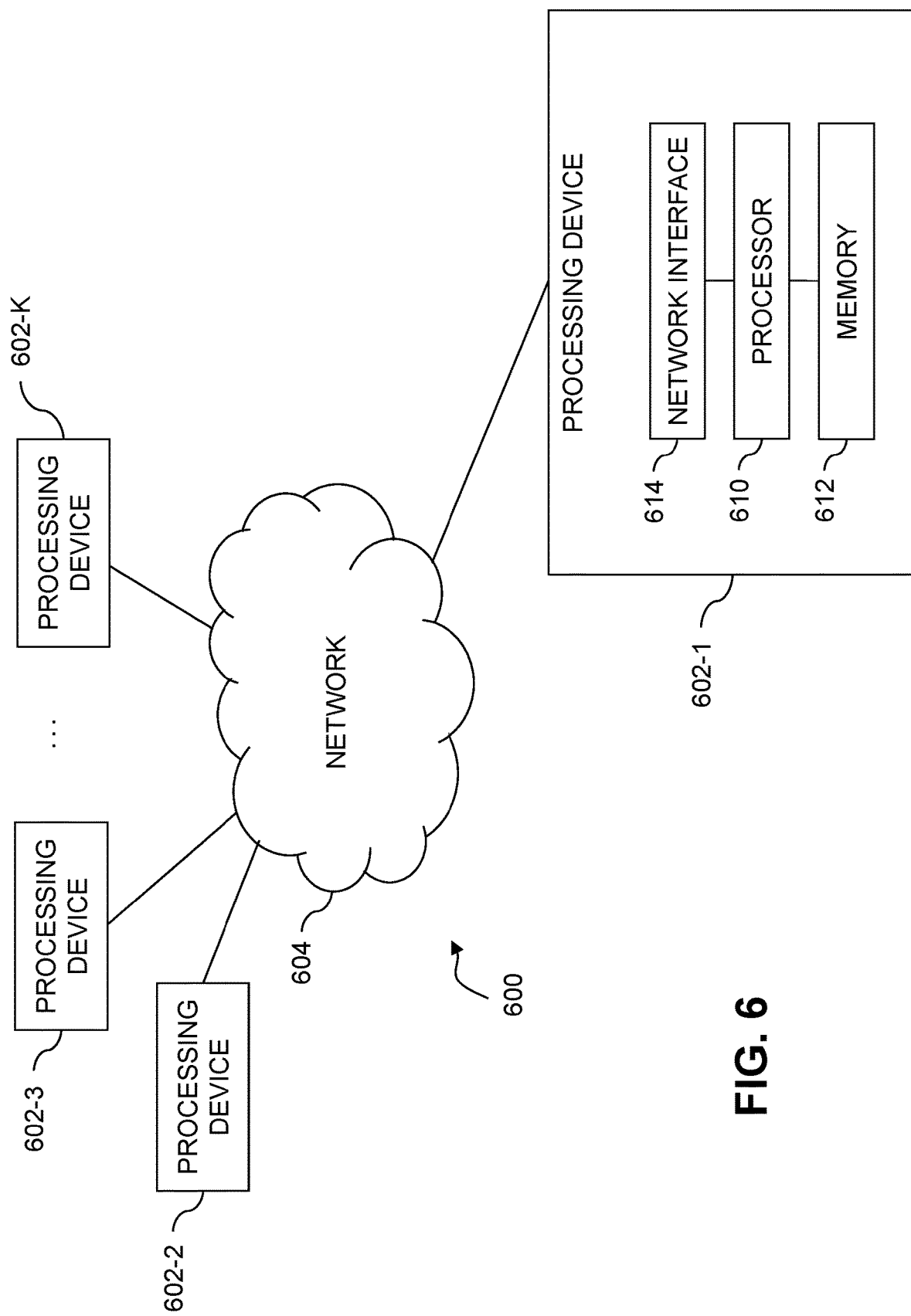

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide intelligent target routing functionality in a distributed storage system of the type described above using one or more processes running on a given one of the VMs. For example, each of the VMs can implement logic instances and/or other components for implementing functionality associated with intelligent target routing in the system 100.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide intelligent target routing functionality in a distributed storage system of the type described above. For example, a container host device supporting multiple containers of one or more container sets can implement logic instances and/or other components for implementing intelligent target routing functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the intelligent target routing functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, initiators, targets, target lookup services and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to establish a plurality of paths between at least one initiator of a host device and a plurality of targets of respective storage nodes of a distributed storage system; and
   for each of a plurality of input-output operations generated in the host device for delivery to the distributed storage system:
   to access a target lookup service of the host device to determine a particular one of the storage nodes that stores data for a logical storage volume and offset targeted by the input-output operation, the target lookup service determining the particular one of the storage nodes at least in part utilizing (i) a first mapping between at least a portion of a logical address space and at least a portion of a physical storage space of the distributed storage system, and (ii) a second mapping, different than the first mapping, between host-side configuration information characterizing one or more of the storage nodes and storage-side configuration information characterizing the one or more storage nodes, the host-side configuration information including information associated with a particular storage access protocol for accessing the one or more storage nodes from the host device and being different than the storage-side configuration information;
   to select a particular one of the plurality of paths from the initiator to one of the targets on the particular storage node; and
   to send the input-output operation to the particular storage node over the selected path.

2. The apparatus of claim 1 wherein the at least one processing device comprises at least a portion of at least one of the host device and one or more additional host devices.

3. The apparatus of claim 1 wherein the initiator of the host device and the targets of the respective storage nodes are configured to support a designated standard storage access protocol.

4. The apparatus of claim 1 wherein the distributed storage system comprises a software-defined storage system and the storage nodes comprise respective software-defined storage server nodes of the software-defined storage system.

5. The apparatus of claim 4 wherein the at least one processing device is further configured to establish the second mapping as a configuration mapping between a first configuration associated with the particular storage access protocol and a second configuration associated with the software-defined storage server nodes of the software-defined storage system.

6. The apparatus of claim 5 wherein the configuration mapping comprises a mapping between a transport IP address of the storage access protocol and a data server IP address of a given one of the software-defined storage server nodes.

7. The apparatus of claim 5 wherein the configuration mapping comprises a mapping between a target identifier of the storage access protocol and a target identifier of a given one of the software-defined storage server nodes.

8. The apparatus of claim 5 wherein the configuration mapping comprises a mapping between a namespace identifier of the storage access protocol and a storage volume object identifier of a given one of the software-defined storage server nodes.

9. The apparatus of claim 1 wherein the target lookup service is implemented at least in part (i) within the initiator of the host device or (ii) as an add-on service to the initiator of the host device.

10. The apparatus of claim 1 wherein the initiator of the host device is implemented at least in part within a smart network interface card of the host device utilizing a data processing unit of the smart network interface card.

11. The apparatus of claim 1 wherein the target lookup service maintains the first mapping between at least a portion of the logical address space and at least a portion of the physical storage space of the distributed storage system.

12. The apparatus of claim 11 wherein the target lookup service maintains the first mapping based at least in part on metadata obtained from one or more control plane servers of the distributed storage system.

13. The apparatus of claim 11 wherein the target lookup service communicates with one or more control plane servers of the distributed storage system via an out-of-band communication channel relative to communication channels utilized for delivery of the input-output operations to the distributed storage system.

14. The apparatus of claim 11 wherein accessing the target lookup service comprises accessing the target lookup service via an application programming interface of the target lookup service.

15. A computer program product comprising a non-transitory processor-readable storage medium having stored therein program code of one or more software programs, wherein the program code when executed by at least one processing device comprising a processor coupled to a memory, causes the at least one processing device:
to establish a plurality of paths between at least one initiator of a host device and a plurality of targets of respective storage nodes of a distributed storage system; and
for each of a plurality of input-output operations generated in the host device for delivery to the distributed storage system:
to access a target lookup service of the host device to determine a particular one of the storage nodes that stores data for a logical storage volume and offset targeted by the input-output operation, the target lookup service determining the particular one of the storage nodes at least in part utilizing (i) a first mapping between at least a portion of a logical address space and at least a portion of a physical storage space of the distributed storage system, and (ii) a second mapping, different than the first mapping, between host-side configuration information characterizing one or more of the storage nodes and storage-side configuration information characterizing the one or more storage nodes, the host-side configuration information including information associated with a particular storage access protocol for accessing the one or more storage nodes from the host device and being different than the storage-side configuration information;
to select a particular one of the plurality of paths from the initiator to one of the targets on the particular storage node; and
to send the input-output operation to the particular storage node over the selected path.

16. The computer program product of claim 15 wherein the target lookup service maintains the first mapping between at least a portion of the logical address space and at least a portion of the physical storage space of the distributed storage system.

17. The computer program product of claim 16 wherein the target lookup service maintains the first mapping based at least in part on metadata obtained from one or more control plane servers of the distributed storage system.

18. A method comprising:
establishing a plurality of paths between at least one initiator of a host device and a plurality of targets of respective storage nodes of a distributed storage system; and
for each of a plurality of input-output operations generated in the host device for delivery to the distributed storage system:
accessing a target lookup service of the host device to determine a particular one of the storage nodes that stores data for a logical storage volume and offset targeted by the input-output operation, the target lookup service determining the particular one of the storage nodes at least in part utilizing (i) a first mapping between at least a portion of a logical address space and at least a portion of a physical storage space of the distributed storage system, and (ii) a second mapping, different than the first mapping, between host-side configuration information characterizing one or more of the storage nodes and storage-side configuration information characterizing the one or more storage nodes, the host-side configuration information including information associated with a particular storage access protocol for accessing the one or more storage nodes from the host device and being different than the storage-side configuration information;
selecting a particular one of the plurality of paths from the initiator to one of the targets on the particular storage node; and
sending the input-output operation to the particular storage node over the selected path;
wherein the method is performed by at least one processing device comprising a processor coupled to a memory.

19. The method of claim 18 wherein the target lookup service maintains the first mapping between at least a portion of the logical address space and at least a portion of the physical storage space of the distributed storage system.

20. The method of claim 19 wherein the target lookup service maintains the first mapping based at least in part on metadata obtained from one or more control plane servers of the distributed storage system.

\* \* \* \* \*